Patented July 4, 1950

2,514,185

UNITED STATES PATENT OFFICE 2,514,185

VINYL CHLORIDE RESIN COMPOSITIONS

Kenneth C. Eberly, Akron, Ohio, assignor to The Firestone Tire & Rubber Company, Akron, Ohio, a corporation of Ohio No Drawing. Application March 31, 1945, Serial No. 586,042

5 Claims. (Cl. 260—87.1)

This invention relates to vinyl chloride based resin compositions having improved physical, chemical, and colloidal properties, and to a method for producing such compositions.

A number of thermoplastic resins based upon vinyl chloride have appeared in recent years and, being low in cost and having many desirable properties, have come into extensive use. These resins are flexible and, with proper compounding, can be made semi-elastic, thus occupying a unique position intermediate between the hard resins and the synthetic elastomers. However, the vinyl chloride resins are subject to a number of defects; notably they are somewhat low in tensile strength; lose their strength and extensibility at temperatures only slightly elevated above normal; are very brittle at low temperatures even when compounded expressly for such service; tend to be somewhat tacky; and are soluble in organic solvents. This last defect is of course very serious where it is sought to employ the vinyl chloride resins in solvent containers and conduits, or where it is sought to use the resins as an adhesive in situations exposed to attack by solvents.

Accordingly, it is an object of this invention to generally improve the physical, chemical, and colloidal properties of vinyl chloride based resins.

Another object is to provide vinyl chloride resin compositions which have high tensile strength and elongation at normal temperatures and which retain these properties even at relatively high temperatures.

Still another object is to provide such compositions which may be flexed at low temperatures without cracking or breaking.

Still another object is to provide such compositions which will be proof against attack by solvents.

A still further object is to provide such compositions which will be "dry" and free from tack.

The above and other objects are secured in accordance with this invention by the incorporation, into a vinyl chloride polymeric or copolymeric resin, of from about 0.25% to about 10% of a polyamine having the formula:

wherein $n$ is an integer from 1 to 5, preferably from 3 to 5, and

R, independently in each occurrence in the expanded formula, indicates hydrogen or a methyl, ethyl or propyl group.

The compositions, relatively slowly at room temperature, and quite rapidly when subjected to heat curing, become converted to materials of greatly enhanced tensile strength, elongation, flexibility in the cold, and resistance to solvents as compared to vinyl resins heretofore prepared. These properties, particularly the solvent resistance, improve progressively with increasing amounts of polyamine employed, and with the duration and intensity of any heat cure applied to the compositions. Without absolute commitment to this theory, it is thought probable that the polyamides effect an increase in molecular aggregation of the resinous molecules by bridging or cross-linking the same in accordance with the reaction:

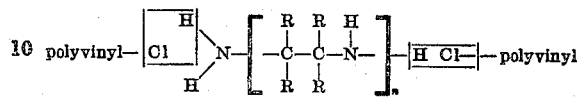

wherein "polyvinyl—Cl" indicates a segment of a vinyl chloride polymer or copolymer resin molecule and the other symbols follow the notation set forth above. It is noted that when "$n$" is greater than 1, as in the preferred embodiments, the polyamine contains secondary amino groups which may likewise enter into bridging reactions, thus providing three-way and higher multiplex bridgings between the resinous molecules. Perhaps also the secondary amino groups serve to abstract and/or sequester the hydrogen chloride evolved as a result of the reaction.

Referring to the vinyl chloride based resins, the properties of which are improved in accordance with this invention, these may be any resins produced by polymerizing vinyl chloride alone or by copolymerizing vinyl chloride with minor proportions of other unsaturated compounds copolymerizable therewith, such, for instance, as vinyl acetate and other vinyl fatty esters; other vinyl halides such as vinyl bromide and vinyl fluoride; vinylidene halides such as vinylidene chloride; acrylic derivatives such as acrylic acid, acrylic esters, methacrylic acids and esters, acrylonitrile, and the like; vinyl ketones, ethers and thioethers; and vinyl esters of inorganic acids. The properties of resins of all of these types may be improved in accordance with this invention. Specific commercial resins which may be improved in accordance with this invention are exemplified in the Vinylites QYNA, VYHH, VYNS, and VYNW (trade names of Carbide & Carbon Chemicals Corporation, the first of these being a straight vinyl chloride polymer and the others being copolymers of vinyl chloride with respectively 15%, 11.5% and 4% of vinyl acetate); and the "Geons" 101 and 202 (trade names of The B. F. Goodrich Company, the first of these products being a straight polyvinyl chloride and the other being a copolymer of vinyl chloride with 6% of vinylidene chloride). These are common commercial vinyl chloride resins. It will be seen that they are constituted largely of vinyl chloride (ranging from 85% to 100%), the balance consisting of the named subsidiary comonomers.

Coming now to the polyalkylene polyamines employed in this invention, as above noted, these may be any compounds having the formula:

wherein $n$ is an integer from 1 to 5, and

R, independently in each occurrence in the expanded formula, represents hydrogen or a methyl, ethyl, or propyl group.

To illustrate the application of the formula, assume that "$n$" is 4 in which case the expanded formula will be:

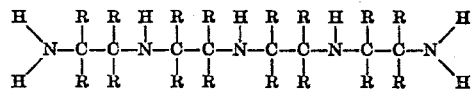

Any of the substituents indicated by "R" can be hydrogen, or a methyl, ethyl or propyl group, irrespective of the substituents indicated by "R" elsewhere in the formula, thus:

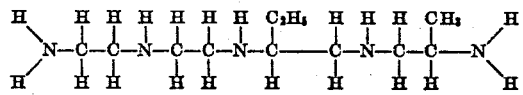

or

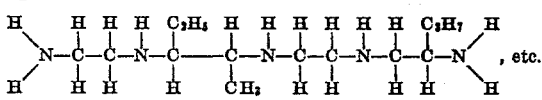

Suitable compounds will thus be seen to include, inter alia, ethylene diamine, diethylene triamine, triethylene tetramine, tetraethylene pentamine, pentaethylene hexamine, tripropylene tetramine, compounds on the order of

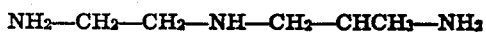

and

and the like. Those acquainted with the art will recognize these compounds as being products derived from low molecular weight mono-olefins via chlorine addition and condensation with ammonia. All of these compounds are operable in the practice of this invention; however, especially satisfactory results are obtainable with compounds in which "$n$" in the formula above, is from 3 to 5, and in which the substituents indicated by "R" are largely hydrogen atoms, examples of this preferred type of compound being tetraethylene pentamine and pentaethylene hexamine.

The amount of polyalkylene polyamines to be incorporated in the compositions of this invention will vary considerably in accordance with (1) The desired extent of alteration desired in the resinous compositions, more of the polyamines being required where harder, stronger, less soluble, and in extreme cases, less extensible products are desired.

(2) The nature of the polyalkylene polyamine; greater quantities of longer chain polyamines (i. e., those having formulae in which "$n$" is 3 or 4 in accordance with the notation hereinabove) are required to produce a given effect than when short-chain polyalkylene polyamines are employed (i. e., those having formulae in which "$n$" is 1 or 2).

(3) The severity of heat and/or actinic conditions to which the treated products will be subjected in subsequent processing and use—heat and actinic action enhance and accelerate the action of the polyalkylene polyamines, thus diminishing the amount required for any given effect.

In general at least about 0.25% of the polyamine, based on the weight of vinyl resin in a given composition, will be required to effect a noticeable improvement in the properties thereof. The quantity employed may vary up to about 10% on the same basis, at which point the products obtained begin to be too hard, brittle and inextensible for use as products such as are contemplated by this invention. In general quantities on the order of from about 0.5% to about 3% will be preferred. Example I hereinafter sets forth ranges of properties obtainable by the use of varying proportions of the various polyamines, and a fair estimate of the proper amount of polyamine to be employed in any given application may be readily made on the basis of the foregoing general rules in the light of the detailed examples, especially Example I. The precise optimum amount can be readily determined for the particular application by preliminary pilot tests.

As briefly noted above, exposure to heat-curing conditions accelerates and enhances the improvement of the properties of compositions according to this invention. Thus temperatures above 100° C. and preferably from 110° to 160° C., result in a rapid conversion of the compositions to their final cured forms. However, even at room temperature the polyalkylene polyamines gradually effect a conversion of the vinyl resins to products having excellent characteristics.

In many cases it may be desired to fabricate or process the resinous compositions of this invention in the form of solutions, as for instance in fabric coating, paper coating, adhesives, and the like. An especially advantageous feature of this invention resides in the fact that, provided suitable solvents are employed, the solutions of this invention will remain clear and usable for long periods of time. This is not true in the case of any other conversion products of vinyl chloride heretofore produced.

It is understood that the compositions of this invention may likewise contain various compounding ingredients such as plasticizers, reinforcing agents and the like. Plasticizing action may be supplied, for instance, by the addition of elastomers, such as copolymers of butadiene and acrylonitrile, which in addition to supplying a plasticizing action, will contribute to the insolubility of the final products by becoming vulcanized. Similar effects may be obtained by the addition of polymerizable plasticizers such as diallyl phthalate.

The improved vinyl chloride resin compositions of this invention are of advantage in a wide variety of applications by virtue of their lessened solubility, or complete insolubility in organic solvents; and increased tensile strength, hardness and extensibility both at ordinary temperatures and at relatively high temperatures on the order of 250° F. The products, indeed, have properties approaching those of the true elastomers to such a degree that they can be employed as a tire carcass or tread stock if necessary. The compositions are of definite use in the coating of fabrics, paper, and other web material; the molding of semi-hard objects; the fabrication of flexible and non-flexible fuel hose, conduits, and containers; and as adhesive layers in adhering metallic fittings to elastomeric composition, as, for instance, in aircraft fuel cells.

With the foregoing general discussion in mind there are given herewith detailed specific examples of the practice of this invention. All parts given are by weight.

EXAMPLE I

| | Parts |
|---|---|
| Vinyl chloride based resin (VYNW [1], VYNS [1], or polyvinyl chloride) | 100 |
| Alkylene polyamine (ethylene diamine, diethylene triamine or tetraethylene pentamine) | 0, 0.5, 3, 5, 8 or 10 |
| Plasticizer (Kronisol [2] or dioctyl phthalate) | 30, 40, 50 or 80 |
| Carbon black (reinforcing) | 0, 5 or 8 |
| Pigment (MgO or $MgCO_3$) | 0, 3, 5, 10 or 25 |
| Calcium stearate | 5 |
| Carnauba wax | 2 |

[1] "Vinylites VYNW and VYNS" are vinyl chloride-acetate copolymers, products of the Carbide and Carbon Chemicals Corporation, containing respectively 4% and 11.5% of vinylacetate.

[2] "Kronisol" is di(butoxyethyl) phthalate manufactured by both Eastman Kodak Company and the Ohio Apex Company.

To illustrate the range of properties obtainable in compositions according to this invention, a series of formulations within the scope of the above schedule was compounded on a roll mill. These formulations were subjected to press cure at various temperatures, and for various periods of time. For comparison, specimens of some of the formulations were left uncured. The tensile strength; elongation at break at various temperatures; modulus of elasticity at 200% elongation; ability to flex without cracking at −40° F.; and the solubility of the various specimens was determined. The compositions of the formulations prepared; the times and temperatures of curing of these formulations; and the properties of the resultant specimens; are set forth herewith in Table I.

Table I

| Vinyl Resin | Added Ingredients (per cent on basis of vinyl resin) | | | | | | | Cure | | Properties of Compound | | | | | | |
|---|---|---|---|---|---|---|---|---|---|---|---|---|---|---|---|---|
| | Polyamine | | Plasticizer | | Pigments | | Carbon Black, Per Cent | Time, Min. | Temp., °F. | Tensile Strength, (#/in.²) | Elongation | | 200% Modulus | Flex. at −40° F. | Solubility | Item No. |
| | Type | Per Cent | Type | Per Cent | Type | Per Cent | | | | | Temp., °F. | Per Cent | | | | |
| VYNW | Ethylene Diamine | 10 | Kronisol | 40 | | | | 0 | | | | | | | sol | 1 |
| | | | | | | | | 20 | 200 | | | | | | insol | 2 |
| | | | | | | | | 60 | 120 | | | | | | slight | 3 |
| | | | | | | | | 180 | 120 | | | | | | insol | 4 |
| | | 3 | Dioctyl Phthalate | 40 | $MgCO_3$ | 3 | 5 | 0 | | 3,050 | 65 | 110 | | broke | sol | 5 |
| | | | | | | | | 30 | 300 | 3,925 | 65 | 210 | 3,825 | OK | insol | 6 |
| | | 5 | same | 40 | $MgCO_3$ | 3 | 5 | 0 | | 3,000 | 65 | 120 | | broke | sol | 7 |
| | | | | | | | | | | | 100 | 160 | | | | |
| | | | | | | | | | | | 200 | 90 | | | | |
| | | | | | | | | 30 | 300 | 3,850 | 200 | 390 | 3,650 | OK | insol | 8 |
| | | 10 | same | 40 | $MgCO_3$ | 3 | 5 | 30 | 300 | 3,800 | 200 | 390 | 3,675 | OK | insol | 9 |
| PVC [1] | Ethylene Diamine | 0 | Dioctyl Phthalate | 40 | $MgCO_3$ | 3 | 5 | 0 | | 2,625 | 65 | 200 | 2,625 | broke | sol | 10 |
| | | | | | | | | | | | 200 | 50 | | | | |
| | | 8 | same | 40 | $MgCO_3$ | 3 | 5 | 30 | 300 | 3,000 | 65 | 200 | 3,000 | OK | insol | 11 |
| | | | | | | | | | | | 200 | 340 | | | | |
| VYNW 30%, VYNS 70% | Ethylene Diamine | 8 | Dioctyl Phthalate | 30 | $MgCO_3$ | 3 | 5 | 20 | 300 | 3,625 | 65 | 270 | 3,350 | | | 12 |
| | | | | 50 | $MgCO_3$ | 3 | 5 | 20 | 300 | 2,750 | 65 | 300 | 2,175 | | | 13 |
| | | | | 80 | $MgCO_3$ | 3 | 5 | 20 | 300 | 1,775 | 65 | 365 | 775 | | | 14 |
| | | | | | | | | 0 | | 1,325 | 100 | 280 | | | | 15 |
| | | | | | | | | 30 | 300 | 1,825 | 65 | 365 | | | | 16 |
| | | | | | | | | | | | 100 | 300 | | | | |
| | | | | | | | | | | | 160 | 270 | | | | |
| | | | | | | | | | | | 200 | 110 | | | | |
| VYNS | Ethylene Diamine | 0.5 | Dioctyl Phthalate | 80 | $MgCO_3$ | 2 | 3 | 30 | 300 | 3,325 | 65 | 330 | 1,500 | OK | slight | 17 |
| VYNW | Diethylene Triamine | 8 | Dioctyl Phthalate | 40 | $MgCO_3$ | 3 | 5 | 30 | 300 | 3,750 | 65 | 170 | | OK | insol | 18 |
| | | | | | | | | | | | 100 | 200 | | | | |
| | | | | | | | | | | | 200 | 110 | | | | |
| VYNW | Tetraethylene Pentamine | 3 | Kronisol | 40 | | | | 0 | | | | | | | sol | 19 |
| | | | | | | | | 20 | 200 | | | | | | insol | 20 |
| | | | | | | | | 60 | 120 | | | | | | slight | 21 |
| | | | | | | | | 180 | 120 | | | | | | insol | 22 |
| VYNW | Tetraethylene Pentamine | 10 | Kronisol | 40 | | | | 0 | | | | | | | sol | 23 |
| | | | | | | | | 20 | 200 | | | | | | insol | 24 |
| | | | | | | | | 60 | 120 | | | | | | insol | 25 |
| | | | | | MgO | 5 | | 30 | 300 | 3,025 | 65 | 140 | | | insol | 26 |
| | | | | | do | 10 | | 30 | 300 | 3,500 | 65 | 150 | | | | 27 |
| | | | | | do | 25 | 0 | 30 | 300 | 3,025 | 65 | 140 | | | | 28 |
| | | | | | | | 8 | 30 | 300 | 3,775 | 65 | 150 | | | | 29 |
| | | | | | $MgCO_3$ | 3 | 5 | 30 | 300 | 3,900 | 65 | 160 | | | | 30 |
| | | | | | | | | 20 | 300 | 3,600 | 65 | 140 | | | | 31 |
| | | | | | | | | 40 | 300 | 3,850 | 65 | 130 | | | | 32 |
| | | | | | | | | 60 | 300 | 2,275 | 65 | 100 | | | | 33 |

[1] A straight polyvinyl chloride.

EXAMPLE II

Item No. 17 in Table I seemed to have properties adapting it as a tire tread and carcass stock, and accordingly the press-cured stock was subjected to tests with a view to evaluating the same for this purpose. Parallel tests were run on a press-cured GR-S tire tread stock. The results are tabulated herewith.

Table II

|  | Compound of this Invention | GR-S Stock |
| --- | --- | --- |
| Tensile strength_____lbs. per sq. in__ | 2,325 | 2,300 |
| Elongation at break_____per cent__ | 330 | 600 |
| Modulus at 200% elongation__lbs. per sq. in__ | 1,500 | 500 |
| Running temperature_____°F__ | 252 | 288 |
| Penetration at running temperature (Firestone Plastometer, 1 lb. weight)_____ | 87 | 75 |
| Rebound at 212° F_____ | 17 | 45 |

It will be seen that the vinyl compound of this invention has properties sufficiently similar to those of GR-S rubber to be of interest as a tire tread stock. A tire was accordingly built from this compound, the unaltered stock being used for the tread, and the plasticizer being increased to 80 parts per 100 parts vinyl resin for the plies. Vulcanization was at 300° F. for 30 minutes. The tire was tested in a machine simulating a road test, failure being indicated at 7000 miles.

EXAMPLE III

| | Parts |
| --- | --- |
| Vinylite VYNS (copolymer of 88.5% vinyl chloride, 11.5% vinyl acetate) | 100 |
| Tetraethylene pentamine | 8 |
| Dioctyl phthalate | 20 |
| Calcium stearate | 5 |
| Wax | 2 |
| Carbon black (reinforcing) | 5 |
| Magnesium carbonate | 3 |

The above ingredients were compounded on a roll mill and press-cured for thirty minutes at 300° F. in the shape of a sheet metal forming wedge for hand-forming of attach angles in airframe construction. Heretofore, such wedges have been made from maple wood, which has an average life of one hour in service. The wedges of this example were found to be fully as satisfactory in use as the maple wedges, and lasted indefinitely.

EXAMPLE IV

| | Parts |
| --- | --- |
| Vinylite VYNW (copolymer of 96% vinyl chloride, 4% vinyl acetate) | 100 |
| Tetraethylene pentamine | 8 |
| Dioctyl phthalate | 50 |
| Magnesium carbonate | 5 |
| Titanium dioxide pigment | 5 |
| Calcium stearate | 5 |
| Carnauba wax | 2 |

The foregoing ingredients were compounded on a roll mill and calendered onto 10 oz. cotton sheeting to a depth of coating of .004". The resultant fabric met the government specification AN–CCC–F–56. The fabric was non-tacky at elevated temperatures. The fabric had the unique property of being flexible at −67° F.

EXAMPLE V

Adhesive

Adhesive composition:

| | Parts |
| --- | --- |
| Vinylite VYNS (copolymer of 88.5% vinyl chloride, 11.5% vinyl acetate) | 100 |
| Methyl isobutyl ketone | 566 |
| Tetraethylene pentamine | 5 |

Elastomer Adhered:
Butadiene-acrylonitrile copolymer containing 45% acrylonitrile constituent.

Substrates:
1. Aluminum (sandblasted, solvent degreased, etched 2 minutes at 70° C. in a solution comprising:
   Nitric acid (conc.), 93 parts
   $K_2Cr_2O_7$, 89 parts
   Water, 368 parts
   rinsed in boiling water, rinsed in ethanol and dried at 110° C.
2. Steel, sandblasted.
3. Steel, sandblasted, degreased, etched two minutes at 70° in 10% sulfuric acid, rinsed in boiling water, rinsed in alcohol, dried at 110° C.
4. Sherardized steel, sandblasted and etched in the same manner as the aluminum (1) above.

An adhesive cement was prepared from the ingredients listed above under "Adhesive composition" and used to adhere strips of the butadiene-acrylonitrile copolymer to the several metallic substrates listed. In each case the substrate was coated with the cement, dried at 130° F. and plied up with the elastomer strip, the assembly being press-cured at 302° F. for forty-five minutes. The cured assemblies were then subjected to an open steam recure at 280° F. to simulate the recure which adhered metallic fittings undergo when built into elastomer composition aircraft fuel cells. The assemblies were then immersed in aviation gasoline for forty-eight hours, at the end of which time the assemblies were removed and the elastomer strips pulled off. In every case failure occurred by tearing of the elastomer stock, rather than by peeling at the interface between elastomer and substrate.

The cement of this example was stored at room temperature for one week, at the end of which time no substantial deterioration had taken place.

From the foregoing general discussion and detailed specific examples, it is evident that the practice of this invention effects a very marked enhancement in the properties of vinyl chloride based resins, improving their performance in conventional applications and extending their field of usefulness to novel applications for which vinyl resins have not heretofore been found suitable. In addition the practice of this invention involves the use of the domestically produced and readily procurable vinyl chloride based resins and alkylene polyamines.

What is claimed is:
1. A homogeneously compounded composition comprising polyvinyl chloride together with from 0.5% to 3.0%, based on the weight of polyvinyl chloride, of tetraethylene pentamine.
2. A homogeneously compounded composition comprising a resinous copolymer of vinyl chloride with a minor proportion of vinyl acetate containing at least 85% of vinyl chloride copolymer- ized therein, together with from 0.5% to 3.0% of tetraethylene pentamine.

3. Process for enhancing the high and low elongation, modulus of elasticity, and flexibility of low temperatures of a resin selected from a group consisting of homopolymers of vinyl chloride and copolymers thereof with vinyl chloride and with vinyl acetate containing at least 85% of vinyl chloride copolymerized therein, which comprises compounding with such resin from 0.5% to 3.0% of tetraethylene pentamine and vulcanizing the composition at temperatures from 100° F. to 350° F. for from 20 to 180 minutes.

4. A homogeneously compounded composition comprising a resin selected from the group consisting of homopolymers of vinyl chloride and copolymers thereof with vinyl acetate and with vinylidene chloride containing copolymerized therein at least 85% of vinyl chloride together with from 0.5% to 3.0%, on the basis of the weight of said resin of tetraethylene pentamine.

5. A homogeneously compounded composition comprising a resinous copolymer of vinyl chloride with a minor proportion of vinylidene chloride, and containing at least 94% of vinyl chloride copolymerized therein, together with from 0.5% to 3.0%, based on the weight of copolymer, of tetraethylene pentamine.

KENNETH C. EBERLY.

REFERENCES CITED

The following references are of record in the file of this patent:

UNITED STATES PATENTS

| Number | Name | Date |
| --- | --- | --- |
| 2,304,637 | Hardy | Dec. 8, 1942 |
| 2,403,960 | Stoops et al. | July 16, 1946 |
| 2,406,837 | Johnston | Sept. 3, 1946 |
| 2,421,852 | Rogers et al. | June 10, 1947 |
| 2,451,172 | Reuter | Oct. 12, 1948 |